United States Patent
Wu et al.

(10) Patent No.: US 10,280,346 B2
(45) Date of Patent: May 7, 2019

(54) ONE-PART CURABLE ADHESIVE COMPOSITION AND THE USE THEREOF

(71) Applicant: Henkel AG & Co. KGaA, Duesseldorf (DE)

(72) Inventors: Haiping Wu, Shanghai (CN); Thomas Bachon, Duesseldorf (DE); Rainer Schonfeld, Duesseldorf (DE); Xiaowei Lin, Shangahi (CN); Zhenfeng Cao, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/789,283

(22) Filed: Oct. 20, 2017

(65) Prior Publication Data
US 2018/0044565 A1 Feb. 15, 2018

Related U.S. Application Data

(63) Continuation of application No. PCT/CN2015/077932, filed on Apr. 30, 2015.

(51) Int. Cl.
*C08G 59/40* (2006.01)
*C08L 63/00* (2006.01)
*C09J 11/06* (2006.01)
*C09J 163/00* (2006.01)

(52) U.S. Cl.
CPC ........ *C09J 163/00* (2013.01); *C08G 59/4021* (2013.01); *C08L 63/00* (2013.01); *C09J 11/06* (2013.01)

(58) Field of Classification Search
None
See application file for complete search history.

(56) References Cited

U.S. PATENT DOCUMENTS

| | | | |
|---|---|---|---|
| 2011/0253943 A1 | 10/2011 | Liang et al. | |
| 2013/0115442 A1* | 5/2013 | Sang | C08G 59/4253 428/327 |
| 2014/0150970 A1 | 6/2014 | Desai et al. | |
| 2016/0152819 A1* | 6/2016 | Balijepalli | C09J 163/00 523/456 |

FOREIGN PATENT DOCUMENTS

| | | |
|---|---|---|
| CN | 101148571 | 3/2008 |
| CN | 102627932 | 8/2012 |
| CN | 102911631 | 2/2013 |
| CN | 104479607 | 4/2015 |
| CN | 104497481 | 4/2015 |
| JP | 2004182935 | 7/2004 |
| KR | 20070118360 | 12/2007 |
| WO | 2007025007 | 3/2007 |
| WO | 2011056357 | 5/2011 |
| WO | 2014062531 | 4/2014 |

OTHER PUBLICATIONS

International Search Report issued in connection with International Patent Application No. PCT/CN2015/077932 dated Feb. 15, 2016.

* cited by examiner

*Primary Examiner* — Ana L. Woodward
(74) *Attorney, Agent, or Firm* — Steven C. Bauman

(57) ABSTRACT

The present invention relates to a one-part curable adhesive composition, in particular, a one-part adhesive composition having excellent initial and aged lap shear strength as well as low viscosity, and to the use thereof.

21 Claims, No Drawings

US 10,280,346 B2

ONE-PART CURABLE ADHESIVE COMPOSITION AND THE USE THEREOF

TECHNICAL FIELD

The present invention relates to a one-part curable adhesive composition, in particular a one-part adhesive composition having excellent initial and aged lap shear strength as well as low viscosity, and to the use thereof.

BACKGROUND

Epoxy resin adhesives possess excellent adhesion and bonding properties to materials, for example, metals, plastics, glasses, ceramics, etc. Due to the excellent performance in mechanical property, electrical insulation, heat resistance, and chemical resistance of the cured bonding products, epoxy resin adhesives have been widely applied in machinery manufacturing, electrical and electronics, aerospace, shipbuilding, automotive, construction and others.

Such an adhesive is expected to have a suitable viscosity, especially not to be very viscous, in order to be applied and spread on the substrate evenly in a short period of time. This may increase the efficiency of an assembly process in automated manufacturing. The bonding strength of such an adhesive depends on the compatibility between adhesive and the substrate to which, the adhesive is to be applied, i.e., on the adhesion between adhesive and substrate. However, the bonding strength also relies on the cohesion of the adhesive itself. Even small changes in the composition of the adhesive, for example, some additives including diluent or in its molecular structure may give rise to a drastic reduction in bond strength. And therefore, it may make the adhesive completely unusable or may weaken, or even totally destroy a bond produced by using such an adhesive.

CN102911631 discloses a one-part epoxy resin adhesive composition, comprising at least one non-toughed epoxy resin; a toughed epoxy resin; a polyether amine modified epoxy prepolymer, an aging additive containing carbodiimide; a latent curing agent. In order to lower the viscosity of the product, monofunctional epoxy reactive diluent is further added. Although the adhesive product exhibits a good stability even after aging, the initial and post-aging lap shear strength are both lower than 35 MPa.

Accordingly, there is still a need for a one-part curable epoxy resin adhesive composition having a lower viscosity, an excellent aging behavior and providing a better adhesive strength.

SUMMARY OF THE INVENTION

One aspect of the present invention is one-part curable adhesive composition, comprising:
(a) a non-toughened epoxy resin having two glycidyl groups in one molecule,
(b) a non-toughened epoxy resin having more than two glycidyl groups in one molecule,
(c) a toughened epoxy resin,
(d) a latent curing agent,
(e) a curing accelerator,
(f) an aging resistant agent; and
(g) a non-reactive diluent selected from the group consisting of mono(meth)acrylate, di(meth)acrylate, tri(meth)acrylate, tetra(meth)acrylate compound, and combination thereof.

Another aspect of the present invention is a method of bonding substrates together which comprises applying the one-part curable adhesive composition according to the present invention to a first substrate, bringing a second substrate in contact with the adhesive composition applied to the first substrate, and subjecting the applied composition to conditions which allow the applied composition to be cured.

Yet, another aspect of the present invention is a cured product of the one-part curable adhesive composition according to the present invention of prepared by the method of bonding substrates together according to the present invention.

Yet, another aspect is the use of the one-part curable adhesive composition according to the present invention or the cured product according to the present invention in bonding substrates together.

Other features and aspects of the subject matter are set forth in greater detail below.

DETAILED DESCRIPTION

It is to be understood by one of ordinary skill in the art that the present discussion is a description of exemplary embodiments only, and is not intended as limiting the broader aspects of the present invention.

Herein, "comprising" means that other steps and other components which do not affect the end result can be added. This term encompasses the terms "consisting of" and "consisting essentially of".

In one aspect, the present disclosure is generally directed to one-part curable adhesive composition, comprising:
(a) a non-toughened epoxy resin having two glycidyl groups in one molecule,
(b) a non-toughened epoxy resin having more than two glycidyl groups in one molecule,
(c) a toughened epoxy resin,
(d) a latent curing agent,
(e) a curing accelerator,
(f) an aging resistant agent; and
(g) a non-reactive diluent selected from the group consisting of mono(meth)acrylate, di(meth)acrylate, tri(meth)acrylate, tetra(meth)acrylate, and combination thereof.

The inventor surprisingly found that the one-part curable adhesive composition according to the present invention possess a lower viscosity, which provides the ease during application, without compromising the initial lap shear strength and aging resistance of its cured product.

Component (a)

The one-part curable adhesive composition, according to the present invention, comprises a non-toughened epoxy resin having two glycidyl groups in one molecule which may be interchangably used as non-toughened difunctional epoxy resin in the context.

The term "non-toughened epoxy resin" as used herein, refers generally to an epoxy resin, which does not undergo a toughening treatment, either physically or chemically, and is used in the adhesive composition according to the present invention. The "non-toughened epoxy resin" is thus different vs. the "toughened epoxy resin" as used as component (c) in the present invention. Toughened epoxy resins (c) have undergone a toughening treatment. As an example, they are modified by core-shell rubber particles or a carboxyl-terminated butadiene nitrile polymer.

The non-toughened difunctional epoxy resin to be used in the present invention is a compound selected from bisphenol A based diglycidyl ethers, bisphenol F based diglycidyl ethers, bisphenol S based diglycidyl ethers, bisphenol Z based diglycidyl ethers, halides thereof and hydrides thereof.

The molecular weights of these compounds are not limited. These compounds may be used individually or as a mixture of two or more of them.

Preferably, the non-toughened difunctional epoxy resin is selected from the group consisting of bisphenol A based diglycidyl ethers, bisphenol F based diglycidyl ethers, and combination thereof.

Examples of commercially available products of non-toughened difunctional epoxy resin include Epon 828, Epon 826, Epon 862, Epon 1001, Epon 1002, Epon 1071 (all from Hexion Co., Ltd.), DER 330, DER 331, DER 383, DER 332, DER 330-EL, DER 331-EL, DER 354, DER 321, DER 324, DER 29, DER 353 (all from Dow Chemical Co., Ltd.), JER YX8000, JER RXE21, JER YL 6753, JER YL6800, JER YL980, JER 825, JER 630 (all from Japan Epoxy Resins Co., Ltd.), EP 4300E, EP 4901, EP 4901E, EP 4100HF, EP 490HF, EP 4088S, EP 4000S, EP 4080E, EP4080 (all from ADEKA Corporation), Epichlon 830, Epichlon 830S, Epichlon 835, Epichlon EXA-830CRP, Epichlon EXA-830LVP, Epichlon EXA-835LV (all from DIC Corporation).

If the amount of the non-toughened difunctional epoxy resin is lower than 5% by weight, the viscosity of the adhesive composition may be too high and may not be easy to be applied on a substrate. If the amount of the non-toughened difunctional epoxy resin is greater than 50% by weight, the adhesion strength and reliability may be deteriorated.

In the one-part curable adhesive composition according to the present invention, the non-toughened difunctional epoxy resin is present in an amount of 10% to 50%, preferably 20% to 45% by weight, based on the total weight of all components of the composition.

Component (b)

The one-part curable adhesive composition according to the present invention also comprises a non-toughened epoxy resin having more than two, for example three or four glycidyl groups in one molecule. This non-toughened epoxy resin may be interchangably used as non-toughened multifunctional epoxy resin, for example non-toughened trifunctional or tetrafunctional epoxy resin in the context, respectively.

The non-toughened trifunctional epoxy resin, suitable to be used in the present invention is a triglycidyl ether or triglycidyl amine, preferably triglycidyl amine, selected from the group consisting of N,N,O-triglycidyl-m-aminophenol, N,N,O-triglycidyl-p-aminophenol, fluoroglycinol triglycidyl ether, trihydroxybiphenyl triglycidyl ether, triglycidylaminophenol, and combination thereof.

The non-toughened epoxy resin having four glycidyl groups in one molecule suitable to be used in the present invention is a tetraglycidyl ether or tetraglycidyl amine, preferably tetraglycidyl amine. Suitable examples of tetraglycidyl amines are tetraglycidyldiaminodiphenylmethane, tetraglycidyl-m-xylenediamine, tetraglycidylbis(aminomethylcyclohexane), tetraglycidylbenzophenone, bisresorcinol tetraglycidyl ether, tetraglycidyl ether of methylene dianiline, which may be used individually or as a combination of two or more of them.

Preferably, tetraglycidyl diaminodiphenyl methane is used as the non-toughened multifunctional epoxy resin in the present invention.

Examples of suitable commercially available non-toughened multifunctional epoxy resins include LY 5056, MY 720, MY 721, XB 9721, MY 9512, MY 9612, MY 9634, MY 9655, MY 9663 (all from Huntsman Corporation), AG 80 (from Shanghai Institute of Organic Synthesis), and Jeh 011 (from Changshu Jiafa Chemical Company).

If the amount of the non-toughened multifunctional epoxy resin is lower than 5% by weight, the crosslinking density of the cured product may be too low and a high shearing strength may not be easily achieved. If the amount of the non-toughened difunctional epoxy resin is greater than 20% by weight, the viscosity of the adhesive composition may be too high for application and further formulation.

In the one-part curable adhesive composition according to the present invention, the non-toughened epoxy resin having more than two glycidyl groups in one molecule is present in an amount of 5% to 20%, preferably 6% to 15% by weight, based on the total weight of all components of the composition.

Component (c)

The one-part curable adhesive composition according to the present invention also comprises a toughened epoxy resin, preferably an epoxy resin having two or more glycidyl groups modified by core-shell rubber particles or a carboxyl-terminated butadiene nitrile polymer.

As used herein, the term "toughened epoxy resin" refers to an epoxy resin, which undergoes toughening modification or treatment by a toughening agent based on either physical or chemical mechanism and is used in the adhesive composition according to the present invention. For example, the toughening agent may be physically pre-dispersed in the epoxy resin matrix. The toughening agent may be reactive and capable of reacting substantially completely to form chemical bonds to the epoxy resin matrix.

Suitable examples of the epoxy resin having two or more glycidyl groups used for the toughened epoxy resin are the di-, tri-, or tetra-functional epoxy resins described as above, preferably the difuntional epoxy resins, for example bisphenol A based diglycidyl ethers and bisphenol F based diglycidyl ethers.

Core-shell rubber (CSR) particles are incorporated in the toughened epoxy resin to act as toughening agent, which allow for the toughening of the epoxy resin, and in turn the one-part curable adhesive upon curing. The particles may have an average particle size of from 10 nm to 300 nm, preferably from 50 nm to 200 nm. The particle size as used herein refers to the particle diameter or the largest dimension of a particle in a distribution of particles as determined by laser light scattering such that 50% by weight of the particles in the distribution are smaller than the particle and 50% by weight of the particles in the distribution are larger than the particle. The particle size was measured via dynamic light scattering using a Horiba LA-910 or LA-920 particle size distribution analyzer per manufacturer's recommendations.

Preferably, two types of particles with different particle size are used in the composition. The smaller particles may have an average particle size of less than or equal to 100 nm, preferably from 50 to 90 nm and the larger particles may have an average size of greater than 100 nm, preferably from 150 to 300 nm. The weight ratio of smaller CSR particles to larger CSR particles may be in the range of 3:1 to 5:1. By having different particle sizes, the balance of the key properties such as shear strength, peel strength, and resin fracture toughness can be well controlled.

The core-shell rubber particles may have a soft core comprised of a polymeric material having elastomeric or rubbery properties (i.e., a glass transition temperature less than about 0° C., e.g., less than about −30° C.) surrounded by a hard shell comprised of a non-elastomeric polymeric material (i.e., a thermoplastic or thermoset/crosslinked polymer having a glass transition temperature greater than ambient temperatures, e.g. greater than about 50° C.). For example, the core may be comprised of, for example, a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth)acrylamides, and the like having a suitably high glass transition temperature. The polymer or copolymer used in the shell may have acid groups that are crosslinked ionically through metal carboxylate formation (e.g., by forming salts of divalent metal cations). The shell polymer or copolymer may also be covalently crosslinked by monomers having two or more double bonds per molecule. Other elastomeric polymers may also be suitably be used for the core, including polybutylacrylate or polysiloxane elastomer (e.g., polydimethylsiloxane, particularly crosslinked polydimethylsiloxane). The particle may be comprised of more than two layers (e.g., a central core of one elastomeric material may be surrounded by a second core of a different elastomeric material or the core may be surrounded by two shells of different composition or the particle may have the structure of soft core/hard shell/soft shell/hard shell). Typically, the core comprises from about 50 to about 95 percent by weight of the particle while the shell comprises from about 5 to about 50 percent by weight of the particle.

The core-shell rubber particles may be pre-dispersed in a liquid resin matrix system such as those available from Kaneka Corporation under the trademarks Kane Ace MX.

In addition, elastomeric polymers with epoxy functional groups are also particularly suitable for the use in the present invention as the toughened epoxy resin. Specific examples include epoxy-elastomer adduct formed by reacting epoxy resin with carboxyl-terminated butadiene nitrile (CTBN) elastomer (formed for example from the reaction of the bisphenol A based diglycidyl ether and a carboxyl-terminated butadiene-acrylonitrile elastomer).

Suitable commercial examples of the toughened epoxy resins as component (c) include MX 120 (liquid Bisphenol A epoxy with about 25 wt. % CSR), MX 125 (liquid Bisphenol A epoxy with about 25 wt. % CSR), MX 153 (liquid Bisphenol A epoxy with about 33 wt. % CSR), MX 156 (liquid Bisphenol A epoxy with about 25 wt. % CSR), MX 130 (liquid Bisphenol F epoxy with about 25 wt. % CSR), MX 136 (liquid Bisphenol F epoxy with about 25 wt. % CSR), MX 257 (liquid Bisphenol A epoxy with about 37 wt. % CSR), MX 416 and MX 451 (liquid multifunctional epoxy with about 25 wt. % CSR), MX 215 (Epoxidized Phenol Novolac with about 25 wt. % CSR), and MX 551 (cycloaliphatic epoxy with about 25 wt. % CSR), all from Kaneka Corporation, Albidur 2240A (reactive organosiloxane particles dispersed in bisphenol A glycidyl ether), Albidur 5340A (reactive organosiloxane particles dispersed in cycloaliphatic epoxide), and Albidur 5640, all from Evonik Corporation, Struktol 3652, Struktol 3619, Struktol 3614 (about 60 percent bisphenol A based diglycidyl ethers and about 40 percent CTBN type acrylonitrile-butadiene-rubber containing about 26 percent acrylonitrile), Struktol 3604, Struktol 3605, Struktol 3606, Struktol 3652, and Struktol 3710, all from Struktol Corporation, Hyprox RA95, Hyprox RA840, Hyprox RA1340, Hyprox RF928, Hyprox RM20, and Hyprox RK84L, all from CVC Corporation, ERS-172, EPR-21, EPR-1309, EPR-4026, EPR-4023, and EPR-4030, all from Adeka Corporation), DER 852, DER 791, DER 732, and DER 736, all from Dow Chemical Co., Ltd.

If the amount of the toughened epoxy resin is lower than 10% by weight, the adhesion reliability may be not achieved. On the other hand, if the amount is greater than 50% by weight, the viscosity may be too high and not easy to be applied on a substrate.

In the one-part curable adhesive composition according to the present invention, the toughened epoxy resin is present in an amount of 10% to 50%, preferably 20% to 40% by weight based on the total weight of all components of the composition.

Component (d)

The one-part curable adhesive composition according to the present invention also comprises a latent curing agent. As used herein, "latent curing agent" refers to a curing agent, which is substantially non-reactive with the epoxy resins at room temperature but reacts with the epoxy resins at an elevated temperature. It is preferred that the latent curing agent can start reacting with epoxy resin at a temperature of less than 200° C.

Suitable latent curing agents for use in the present invention are amine-based latent curing agents, preferably, amine compounds having a latent property. Examples of such amine compounds include aromatic primary amines such as diaminodiphenylmethane and diaminodiphenylsulfone; imidazoles such as 2-heptadecylimidazole, 1-cyanoethyl-2-undecylimidazolium trimellitate, 2,4-diamino-6-[2-methylimidazolyl-(1)]-ethyl-S-triazine, 1-dodecyl-2-methyl-3-benzylimidazolium chloride, 2-phenylimidazolium isocyanurate and 2-phenyl-4-methyl-5-hydroxymethylimidazole; boron trifluoride-amine complex; dicyandiamide and derivatives thereof such as dicyandiamide, o-tolylbiguanide and a-2,5-methylbiguanide; organic acid hydrazides such as succinic acid dihydrazide and adipic acid dihydrazide; diaminomaleonitrile and derivatives thereof; and melamine derivatives such as melamine and diallylmelamine.

Other amine-based latent curing agent includes amine adducts which are the reaction products of an amine compound with an epoxy compound, an isocyanate compound and/or a urea compound.

In one embodiment, the latent curing agent is selected from aromatic primary amines, dicyandiamide and derivatives thereof. Preferably, said curing agent is dicyandiamide, and more preferably, is a solid, micronized dicyandiamide. Said solid, micronized dicyandiamide has low solubility at room temperature in the one-part epoxy resin system, and has good storage stability.

Suitable commercially available examples of dicyandiamide products include but are not limited to Omicure DDA 5, Omicure DDA 10, Omicure DDA 50, Omicure DDA 100 (all from CVC Corporation), Dicyane 1400B, Amicure CG-1200G, Amicure CG-325G, Dicyanex 1400F (all from Air Product corporation), Dyhard 100, Dyhard 1100S, Dyhard 100SH, Dyhard 100SF, and Ecure 14 (all from Alzchem Corporation).

In the one-part curable adhesive composition, the latent curing agent is present in an amount of 2% to 20%, preferably 5% to 15% by weight, based on the total weight of all components of the composition.

Component (e)

The one-part curable adhesive composition according to the present invention also comprises a curing accelerator. In the present invention, the curing accelerator is used to promote the curing of epoxy resin. The cure accelerator is the catalyst for the latent curing agent, and includes, but is not limited to urea derivatives, tertiary amines, imidazole derivatives, and the like.

Suitable examples of urea derivatives include p-chlorophenyl-N,N-dimethylurea (monuron), 3-phenyl-1,1-dimethylurea (fenuron) and 3,4-dichlorophenyl-N,N-dimethylurea (diuron). Urea derivatives as cure accelerator are commercially available under the trade name of, for example, Omicure U-24, Omicure U-35, Omicure U-410, Omicure U-52, Omicure U-415, Omicure U-405 (all from CVC Corporation), Amicure UR, Amicure UR7/10, Amicure UR200, Amicure UR300, Amicure UR500, Amicure UR2T, Amicure UR41, Amicure UR-D (all from Air Product Corporation), Dyhard UR200, Dyhard UR300, Dyhard UR500, and Ecure 30 (all from Alzchem Corporation).

Suitable examples of tertiary amines include trimethylamine, tri-ethylamine, tetraethylmethylenediamine, tetramethylpropane-1,3-diamine, tetra-methylhexane-1,6-diamine, pentamethyldiethylenetriamine, bis(2-dimethylaminoethyl) ether, ethylene glycol (3-dimethyl)aminopropyl ether, dimethyl-aminoethanol, dimethylaminoethoxyethanol, N,N,N'-trimethylaminoethylethanolamine, dimethylcyclohexylamine, N,N-dimethylaminomethylphenol, N,N-dimethylpropylamine, N,N,N',N'-tetramethylhexamethylenediamine, N-methylpiperidine, N,N'-dimethylpiperazine, N,N-dimethylbenzylamine, dimethylaminomethylphenol, 2,4,6-tris(dimethylaminomethyl)phenol, 1,8-diazabicycloundecene-7, 1,5-diazabicyclo-nonene-5, dimethylpiperazine, N-methyl-N'-(2-dimethylamino)-ethylpiperazine, N-methylmorpholine, N—(N',N'-(dimethylamino)ethyl)morpholine, N-methyl-N'-(2-hydroxyethyl)morpholine, triethylenediamine and hexamethylenetetramine.

Suitable examples of imidazole derivatives include imidazole, 2-methylimidazole, 2-ethylimidazole, 1-methylimidazole, 2-ethyl-4-methylimidazole, 1-vinylimidazole, N-(3-aminopropyl)imidazole, for example the commercial products under the trade name of Sunmide LH-210, Imicure AMI-1, Imicure AMI-2, Imicure AMI-24, and Imicure HAPI (all from Air Product Corporation).

Among the suitable curing accelerators, urea derivatives are preferred because they may provide better shelf life than tertiary amines and imidazole derivatives. Furthermore, 1,1-dimethyl-3-phenylurea or methylene diphenyl bis(dimethyl urea) is more preferred to be used in the present invention.

In the one-part curable adhesive composition according to the present invention, the curing accelerator is present in an amount of 0.1% to 5%, preferably 0.5% to 3% by weight, based on the total weight of all components of the composition.

Component (f)

The one-part curable adhesive composition according to the present invention further contains an aging resistant agent to maintain the performance of the adhesive after the treatment under high temperature and/or humidity conditions over time.

According to the present invention, the aging resistant agent is selected from at least one of the group consisting of aminosalicylic acids, aminoisophthalic acids, carbodiimides, and derivatives thereof.

Suitable examples of carbodiimides, that can be added to block the carboxylic acid end-groups formed by any hydrolysis reaction of the adhesive products include, but are not limited to, N,N'-di-o-toluyl carbodiimide, N,N'-di-p-toluyl carbodiimide, N,N'-diphenyl carbodiimide, N,N'-di-2,6-dimethylphenyl carbodiimide, N,N'-bis(2,6-diisopropylphenyl) carbodiimide, N,N'-dioctyldecyl carbodiimide, N triyl, N'-cyclohexyl carbodiimide, N,N'-di-2,2-di-tert-butylphenyl carbodiimide, N triyl,N'-phenyl carbodiimide, N,N'-di-p-nitrophenyl carbodiimide, N,N'-di-p-aminophenyl carbodiimide, N,N'-di-p-hydroxyphenyl carbodiimide, and N,N'-dicyclohexyl carbodiimide.

Suitable examples of other compounds, that can be used as the aging resistant agent comprises aminosalicyclic acids, especially 4-amino-salicyclic acid, 5-amino-salicyclic acid or a derivative thereof, or 5-aminoisophthalic acid or derivative thereof, or 1-amino-2-hydroxynaphthalene-4-sulfonic acid or aminosalicylaldehyde, 4-aminophthalic acid, 4-aminophthalonitrile, mercaptosalicylic acid or mercaptoisophthalic acid, or a mixture of two or more of said compounds.

Particular preference is given to the use of 5-aminosalicyclic acid, which has metal chelating properties to help enhance the adhesion of the cured adhesive to a metal or metal coated substrate.

In the one-part curable adhesive composition according to the present invention, the aging resistant agent is present in an amount of 0.1% to 5%, preferably 0.5% to 3% by weight based on the total weight of all components of the composition.

Component (g)

The one-part curable adhesive composition according to the present invention further comprises a non-reactive diluent selected from the group consisting of mono(meth)acrylate, di(meth)acrylate, tri(meth)acrylate, tetra(meth)acrylate, and combination thereof.

As used herein, the term "non-reactive diluent" refers to a diluent in the form of monomer of oligomer inert to the curing reaction of other reactive components and not comprised in the crosslinking system of the cured product.

A representative and non-limited list of suitable monomers includes alkyl acrylates, hydroxyalkyl acrylates, alkoxyalkyl acrylates, acrylated epoxy resins, cyanoalkyl acrylates, alkyl methacrylates, hydroxyalkyl methacrylates, alkoxyalkyl methacrylates, cyanoalkyl methacrylates, N-alkoxymethacrylamides, N-alkoxymethylmethacrylamides, butylene glycol diacrylates, 1,3-butylene glycol diacrylate, butanediol diacrylates, 1,4-butanediol diacrylate, pentanediol diacrylates, 1,5-pentanediol diacrylate, pentanediol diacrylates, 1,6-hexanediol diacrylate, ethoxylated bisphenol A diacrylate, propoxylated neopentyl glycol diacrylate, propylene glycol diacrylate, dipropylene glycol diacrylate, tripropylene glycol diacrylate, ethylene glycol diacrylate, diethylene glycol diacrylate, triethylene glycol diacrylate, tetraethylene glycol diacrylate, polyethylene glycol diacrylate, ethoxylatedtrimethylolpropane triacrylate pentaerythritol triacrylate, 1,3-propanediol, 2-ethyl-2-(hydroxymethyl)triacrylate, propoxylated glyceryl triacrylate, propoxylatedtrimethylolpropane triacrylate, trimethylolpropane triacrylate and tris(2-hydroxyethyl)isocyanurate triacrylate, pentaerythritol tetraacrylate, di-trimethylolpropane tetraacrylate, dipentaerythritol pentaacrylate and ethoxylated pentaerythritol tetraacrylate.

The term "alkyl" as used herein refers to a linear, branched, or cyclic saturated hydrocarbon group typically although not necessarily containing 1 to about 12 carbon atoms, preferably 1 to about 10 carbon atoms, such as methyl, ethyl, n-propyl, isopropyl, n-butyl, isobutyl, t-butyl, octyl, decyl, and the like.

As used herein, "alkoxy" refers to an —O-alkyl group. Examples of alkoxy groups include methoxy, ethoxy, propoxy (e.g., n-propoxy and isopropoxy), t-butoxy, and the like.

In one embodiment of the present invention, non-reactive diluent is preferably selected from the group consisting of pentaerythritol tetracrylate, pentaerythritol triacrylate, 1,6- hexanediol diacrylate, 1,4-butanediol diacrylate, propoxylated glyceryl triacrylate, trimethylolpropane triacrylate, and combination thereof. Particular preference is given to the combination of propoxylated glyceryl triacrylate and trimethylolpropane triacrylate.

These non-reactive diluents are preferred because they provided surprising effect on promoting the cohesive strength and/or adhesive strength of the cured adhesive, as well as maintaining the viscosity of the adhesive composition liable to apply on a substrate.

Suitable commercial examples of the above-mentioned (meth)acrylate monomers include Mcure 300NS, Mcure 301NS, Mcure 400NS (all from Sartomer Corporation), Lite 2020, NX-2023, NX-2023D, NX-2021, and NX-2022 (all from Cardolite Corporation).

If the amount of the non-reactive diluent is lower than 1% by weight, the viscosity may be too high to be easily applied on a substrate, and the initial lap shear strength may be deteriorated. On the other hand, if the amount is greater than 20% by weight, the curing of the adhesive composition may last too long for practical use.

In the one-part curable adhesive composition according to the present invention, the non-reactive diluent is present in an amount of 1% to 20%, preferably 2% to 15% by weight, based on the total weight of all components of the composition.

Other Components

According to the present invention, the one-part curable adhesive composition may optionally comprises a reactive diluent, a thixotropic agent, a silane coupling agent, a filler, and combination thereof.

Suitable examples of the reactive diluents are monoglycidyl ethers, such as phenyl glycidyl ether, alkyl phenol monoglycidyl ether, aliphatic monoglycidyl ether, alkylphenol mono glycidyl ether, alkylphenol monoglycidyl ether, 3-glycidoxypropyl trimethoxysilane, 3-glycidoxypropyl trimethoxysilane, 3-glycidoxypropylmethyldimethoxysilane, 1-(3-glycidoxypropyl) 1,1,3,3,3-pentamethyl disiloxane; diglycidyl ethers, such as 1,4-butanediol diglycidyl ether; 1,4-cyclohexanedimethanol; the diglycidyl ether of resorcinol; diglycidyl ether of cyclohexane dimethanol; diglycidyl ether of neopentyl glycol; triglycidyl ether of trimethylolpropane dipentene; and the divinyl ether of cyclohexanedimethanol; and tri- or tetra-glycidyl ethers, such as trimethylolpropane triglycidyl ether, glycerin triglycidyl ether, and pentaerythritol tetraglycidyl ether.

In one embodiment of the present invention, trimethylolpropane triglycidyl ether is contained in the present composition as a reactive diluent together with the non-reactive diluent as described above.

Suitable commercially available reactive diluents are for example under the trade name of NC-513, Lite 2513HP (both from Cardolite Corporation), ED-502S, ED-509, ED-529, ED-506, ED-503, ED-523T, ED-505, ED-505R, ED-507 (all from Adeka Corporation), DY-C, DY-D, DY-E, DY-F, DY-H, DY-K, DY-L, DY-P, DY-T, DY 3601, and DY-CNO (all from Air Product Corporation).

The one-part curable adhesive composition according to the present invention may contain a reactive diluent in an amount of 0% to 15%, preferably 5% to 10% by weight, based on the total weight of all components of the composition.

Suitable thixotropic agent, which can be optionally used in the present invention includes, but is not limited to, talc, fume silica, superfine surface-treated calcium carbonate, fine particle alumina, plate-like alumina; layered compound such as montmorillonite, spicular compound such as aluminium borate whisker, and the like. Particularly, fume silica is preferred thixotropic agent.

The one-part curable adhesive composition may contain a thixotropic agent in an amount of 0% to 5%, preferably 0.5% to 3.5% by weight, based on the total weight of all components of the composition.

Suitable silane coupling agent, which can be optionally used in the present invention include, but is not limited to, γ-aminopropyltriethoxysilane, γ-mercaptopropyltrimethoxysilane, γ-methacryloxypropyltrimethoxysilane, γ-glycidoxypropyltrimethoxylsilane, phenyltrimethoxysilane, and the like.

Examples of commercial examples of silane coupling agents KH550 and KH560 from Danyang City Chenguang Coincident Dose Co., Ltd.

If present, the one-part curable adhesive composition according to the present invention may contain a silane coupling agent in an amount of 0.1% to 5%, preferably 0.3% to 2% by weight, based on the total weight of all components of the composition.

Suitable filler, which can be optionally used in the present invention includes, but is not limited to silica, diatomaceous earth, alumina, zinc oxide, iron oxide, magnesium oxide, tin oxide, titanium oxide, magnesium hydroxide, aluminium hydroxide, magnesium carbonate, barium sulphate, gypsum, calcium silicate, talc, glass bead, sericite activated white earth, bentonite, aluminum nitride, silicon nitride, and the like.

If present, the one-part curable adhesive composition according to the present invention may contain a filler in an amount of 5% to 20%, preferably 6% to 15% by weight, based on the total weight of all components of the composition.

In one embodiment, the one-part curable adhesive composition according to the present invention comprises:
(a) 10% to 50%, preferably 20% to 45% by weight of the non-toughened epoxy resin having two glycidyl groups in one molecule,
(b) 5% to 20%, preferably 6% to 15% by weight of the non-toughened epoxy resin having more than two glycidyl groups in one molecule,
(c) 10% to 50%, preferably 20% to 40% by weight of the toughened epoxy resin,
(d) 2% to 20%, preferably 5% to 15% by weight of the latent curing agent,
(e) 0.1% to 5%, preferably 0.3% to 2% by weight of the curing accelerator,
(f) 0.1% to 5%, preferably 0.5% to 3% by weight of the aging resistant agent,
(g) 1% to 20%, preferably 2% to 15% by weight of the non-reactive diluent,
(h) 0% to 5%, preferably 0.5% to 3.5% by weight of a thixotropic agent,
(i) 0% to 5%, preferably 0.3% to 2% by weight of a silane coupling agent,
(j) 0% to 20%, preferably 6% to 15% by weight of a filler, and
(k) 0% to 15%, preferably 5% to 10% by weight of a reactive diluent,
in which the weight ratios are based on the total weight of all components of the composition.

The one-part curable adhesive composition according to the present invention possesses a viscosity of lower than 40 Pa·s, preferably lower than 35 Pa·s, measured by an Anton Paar MCR 301 rheometer (manufactured by Anton Paar), at a shear rate of 15 $s^{-1}$, wherein the viscosity is measured by using a plate/plate measuring system with a disc plate diameter of 25 mm and a gap of 0.2 mm, at 25° C.

The one-part curable adhesive composition according to the present invention can be prepared by the steps of (1) mixing together all the components except the curing agent and curing accelerator by mechanical stirring; and (2) adding the curing agent and curing accelerator in the mixture obtained in step (1), and further mixing the mixture by mechanical stirring to obtain a homogeneous composition.

Another aspect of the present invention is a method of bonding substrates together which comprises applying the one-part curable adhesive composition according to the present invention to a first substrate, bringing a second substrate in contact with the adhesive composition applied to the first substrate, and subjecting the applied composition to conditions which allow the applied composition to be cured. A variety of application methods can be utilized, for example spraying, flow-coating, blade-coating, brushing, pouring, immersion, impregnation, dripping, rolling, sprinkle coating, or immersion coating. Examples of the material comprised of each substrate include metals, glasses, resin-based composite materials or ceramics. After applied, the one-part adhesive composition is subjected to a temperature range of about 130° C. to about 180° C. by heating for about 10 min to about 120 min, and then cured.

The present invention likewise relates to a cured product of the one-part curable adhesive composition according to the present invention or prepared by the method of bonding substrates together according to the present invention.

The cured adhesive product according to the present invention exhibits a high initial lap shear strength. Preferably the initial lap shear strength is greater than 40 MPa, wherein lap shear strength is measured according to testing method ISO 4587:2003 at 25° C.

According to the present invention, the cured adhesive product has an excellent aging resistance. The variation of the lap shear strength (in MPa) after being stored at a temperature of 85° C. and a humidity of 85% for 14 days is less than 10%, preferably less than 8%. The aged lap shear strength is measured according to ISO 4587:2003 at 25° C.

The variation can be calculated as follows:

(Initial lap shear strength–Aged lap shear strength)/
Initial lap shear strength×100%.

The following examples are intended to assist one skilled in the art to better understand and practice the present invention. The scope of the invention is not limited by the examples but is defined in the appended claims. All parts and percentages are based on weight unless otherwise stated.

EXAMPLES

Materials:

| Material | Supplier | Function |
| --- | --- | --- |
| Epon 828 | Hexion Co., Ltd | Bisphenol A based liquid epoxy resin |
| Epichlon EXA830LVP | DIC Corporation | Bisphenol F based liquid epoxy resin |
| Syna Epoxy 28 | Synasia Corporation | Difunctional cycloalphatic epoxy resin |
| MX154 | Kaneka Corporation | Toughened epoxy resin |
| MX153 | Kaneka Corporation | Toughened epoxy resin |
| Albidur 5340A | Evonik Corporation | Toughened epoxy resin |
| Struktol 3614 | Struktol Corporation | Toughened epoxy resin |
| $CaCO_3$ | Changzhou Calcium Carbonate company | Filler |
| $BaSO_4$ | Guizhou Hongkai Chemical Co., Ltd | Filler |
| TS 720 | Cabot Corporation | Fumed silicon dioxide |
| KH560 | Danyang City Chenguang Coincident Dose Co., Ltd. | Silane coupling agent |
| Mcure 300NS | Sartomer Company | Non-reactive diluent |
| DY-T | Air Product Corporation | Reactive diluent |
| ED-502S | Adeka Corporation | Reactive diluent |
| ED-523T | Adeka Corporation | Reactive diluent |
| XB9721 | Huntsman Corporation | Tetrafunctional epoxy resin |
| MY721 | Huntsman Corporation | Tetrafunctional epoxy resin |
| 5-aminiosalicylic acid | Sigma-Aldrich | Aging resistant agent |
| Dyhard 100SH | Alzchem Corporation | Dicyandiamide |
| Omicure DDA 5 | CVC Corporation | Dicyandiamide |
| Amicure UR 300 | Air Product Corporation | Curing accelerator |
| Amicure UR 200 | Air Product Corporation | Curing accelerator |
| Omicure U 52 | CVC Corporation | Curing accelerator |

Examples 1 to 5 (E1 to E5)

Specific compositions including the amount and type of components are shown in Table 1. Examples E1 to E5 are prepared as follows: difunctional epoxy resin, tetrafunctional epoxy resin, silane coupling agent, non-reactive diluent, aging resistant agent, thixotropic agent (fumed silicon dioxide) and filler were dispersed by mechanical stirring at 500 rpm at 25° C. for 15 min. Subsequently, dicyandiamide and curing accelerator were added to the mixture, and further, dispersed by mechanical stirring at 300 rpm at 25° C. for 15 min. The obtained mixture was then placed into a mixing cup, and mixed under vacuum for 1 min at 2000 rpm with a speed shearing mixer.

Comparative Examples 1 to 5 (CE1 to CE5)

Specific compositions including the amount and type of components are shown in Table 1. The preparations of the comparative examples are similar to those for E1 to E5, except that the diluent was not used for CE1, tetrafunctional epoxy resin was not used for CE2, 5-aminiosalicylic acid was not used for CE3, and reactive diluents ED-502S and ED-523T instead of Mcure 300NS were used for CE4 and CE5 respectively, as indicated in Table 1.

TABLE 1

The compositions of inventive examples and comparative examples (in gram)

| Component | E1 | E2 | E3 | E4 | E5 | E6 | E7 | CE1 | CE2 | CE3 | CE4 | CE5 |
|---|---|---|---|---|---|---|---|---|---|---|---|---|
| Epon 828 | — | 36.72 | 31.83 | — | — | — | 29.12 | — | — | — | 31.60 | — |
| Epichlon EXA830LVP | 31.83 | — | — | 21.5 | 31.9 | 34.1 | — | 35.2 | 36 | 32.35 | — | — |
| Syna Epoxy 28 | — | — | — | — | — | — | — | — | — | — | — | 31.60 |
| MX154 | 27.87 | 25.61 | — | — | 28 | — | 25.5 | 30.83 | 31.53 | 28.32 | — | — |
| MX153 | — | — | 27.87 | — | — | 29.86 | — | — | — | — | 24.49 | — |
| Albidur 5340A | — | — | — | — | — | — | — | — | — | — | — | 24.49 |
| Struktol 3614 | — | — | — | 38.7 | — | — | — | — | — | — | — | — |
| CaCO₃ | 9.29 | — | 9.29 | — | 9.31 | 9.95 | 8.50 | 10.28 | 10.51 | 9.44 | — | 8.16 |
| BaSO₄ | — | 8.54 | — | 6.45 | — | — | — | — | — | — | 8.16 | — |
| TS 720 | 0.6 | 0.55 | 0.6 | 1.07 | — | 0.64 | 0.55 | 0.66 | 0.68 | 0.61 | 0.53 | 0.53 |
| KH560 | 0.94 | 0.86 | 0.94 | 1.01 | 0.94 | 1.00 | 0.86 | 1.03 | 1.06 | 0.95 | 0.82 | 0.82 |
| Mcure 300NS | 9.59 | 8.81 | 9.59 | 4 | 9.6 | 10.47 | 8.78 | — | 10.85 | 9.75 | — | — |
| DY-T | — | — | — | 8.9 | — | — | — | — | — | — | — | — |
| ED-502S | — | — | — | — | — | — | — | — | — | — | 8.78 | — |
| ED-523T | — | — | — | — | — | — | — | — | — | — | — | 8.78 |
| XB9721 | 10 | — | 10 | 9.27 | 10.01 | 5.53 | 15.80 | 11.05 | — | 10.15 | 15.13 | 15.13 |
| MY721 | — | 9.18 | — | — | — | — | — | — | — | — | — | — |
| 5-amino-salicylic acid | 1.59 | 1.47 | 1.59 | 1.48 | 1.6 | 0.69 | 2.20 | 1.77 | 1.81 | — | 2.42 | 2.42 |
| Dyhard 100SH | 7.59 | — | — | — | — | — | 7.68 | 8.4 | 6.78 | 7.72 | — | — |
| Omicure DDA 5 | — | 7.53 | 7.59 | 6.88 | 7.61 | 7.06 | — | — | — | — | 7.37 | 7.37 |
| Amicure UR 300 | 0.7 | 0.73 | — | — | — | — | — | 0.77 | 0.79 | 0.71 | 0.70 | — |
| Amicure UR 200 | — | — | 0.7 | — | — | — | 0.73 | — | — | — | — | 0.70 |
| Omicure U52 | — | — | — | 0.75 | 1.0 | 0.68 | — | — | — | — | — | — |

Evaluation:
Viscosity of the Adhesive Compositions

The viscosity of the compositions was measured by an Anton Paar MCR 301 rheometer (manufactured by Anton Paar), at a shear rate of 15 s$^{-1}$, using a plate/plate measuring system with a disc plate diameter of 25 mm and a gap of 0.2 mm, at 25° C.

Initial and Aged Lap Shear Strength of the Cured Adhesive Products

The specimens were prepared by the follow procedures:
1) cleaning the surface of a first substrate of cold-roll steel;
2) applying the prepared adhesive compositions according to the examples onto the first substrate;
3) bringing a second substrate of cold-roll steel in contact with the adhesive composition applied to the first substrate, and
4) subjecting the applied composition to 150° C. by heating for 60 min.

The bonded specimens for aging test were further stored in a climate chamber at a temperature of 85° C. and under 85% humidity for 2 weeks.

The values of initial and aged lap shear strength of the cured adhesive products were measured according to ISO 4587:2003 at 25° C. using an Instron tensile tester Model 5996. Test specimens were prepared with cold rolled steel coupons with dimension of 25 mm in width and 0.2 mm in thickness that had been cleaned before test. The overlapping area has dimension of 12.5 mm in length and 25 mm in width.

The test results of the lap shear strength are listed in Table 2.

TABLE 2

Test results of lap shear strength

| Item | E1 | E2 | E3 | E4 | E5 | E6 | E7 | CE1 | CE2 | CE3 | CE4 | CE5 |
|---|---|---|---|---|---|---|---|---|---|---|---|---|
| Viscosity (Pa · s) | 26.0 | 24.4 | 11.8 | 22.8 | 24.0 | 10.1 | 31.2 | 43.5 | 13.4 | 14.2 | 26.9 | 10.9 |
| Initial lap shear strength (MPa) | 50 | 43.3 | 47.5 | 42.5 | 46.1 | 40.5 | 43.0 | 37.9 | 39.2 | 41.6 | 35.2 | 25.1 |
| Aged lap shear strength (MPa) | 48.8 | 42.1 | 45.0 | 42.0 | 43.8 | 38.7 | 41.8 | 34.3 | 23.3 | 19.1 | 32.4 | 22.3 |
| Variation of lap shear strength (%) | 2.4 | 2.8 | 5.3 | 1.2 | 5.0 | 4.5 | 2.8 | 9.4 | 15 | 54 | 8.0 | 8.9 |

As can be seen in the results in Table 2, the adhesive compositions according to the present invention all contributed to viscosity lower than 40 Pa·s for uncured composition and initial lap shear strength greater than 40 MPa for cured product. In addition, the cured products produced by the inventive examples exhibited a high lap shear strength greater than 35 MPa and an excellent mechanical stability even after aging, which was demonstrated by a variation of lap shear strength lower than 8%. However, at least one of these properties could not be achieved by the comparative examples 1 to 5.

What is claimed is:

1. A one-part curable adhesive composition, comprising:
   (a) a non-toughened epoxy resin having two glycidyl groups in one molecule,
   (b) a non-toughened epoxy resin having more than two glycidyl groups in one molecule,
   (c) a toughened epoxy resin,
   (d) a latent curing agent,
   (e) a curing accelerator,
   (f) an aging resistant agent; and
   (g) a non-reactive diluent selected from the group consisting of mono(meth)acrylate, di(meth)acrylate, tri(meth)acrylate, tetra(meth)acrylate and combination thereof.

2. The one-part curable adhesive composition according to claim 1, wherein the non-toughened epoxy resin having two glycidyl groups in one molecule is at least one of selected from the group consisting of bisphenol A based diglycidyl ethers, bisphenol F based diglycidyl ethers, bisphenol S based diglycidyl ethers, bisphenol Z based diglycidyl ethers, halides thereof and hydrides thereof, and combination thereof.

3. The one-part curable adhesive composition according to claim 1, wherein the non-toughened epoxy resin having more than two glycidyl groups in one molecule is selected from the group consisting of a non-toughened epoxy resin having three glycidyl groups in one molecule and a non-toughened epoxy resin having four glycidyl groups in one molecule, and combination thereof.

4. The one-part curable adhesive composition according to claim 3, wherein non-toughened epoxy resin having three glycidyl groups in one molecule is selected from the group consisting of N,N,O-triglycidyl-m-aminophenol, N,N,O-triglycidyl-p-aminophenol, fluoroglycinol triglycidyl ether, trihydroxybiphenyl triglycidyl ether, triglycidylaminophenol, and combination thereof.

5. The one-part curable adhesive composition according to claim 4, wherein the non-toughened epoxy resin having four glycidyl groups in one molecule is selected from the group consisting of tetraglycidyldiaminodiphenylmethane, tetraglycidyl-m-xylenediamine, tetraglycidylbis(aminomethylcyclohexane), tetraglycidylbenzophenone, bisresorcinol tetraglycidyl ether, tetraglycidyl ether of methylene dianiline, and combination thereof.

6. The one-part curable adhesive composition according to claim 1, wherein the toughened epoxy resin is an epoxy resin having two or more glycidyl groups modified by core-shell rubber particles or a carboxyl-terminated butadiene nitrile polymer.

7. The one-part curable adhesive composition according to claim 1, wherein the latent curing agent is dicyandiamides.

8. The one-part curable adhesive composition according to claim 1, wherein the curing accelerator is selected from the group consisting of tertiary amine, imidazole, urea derivative, and combination thereof.

9. The one-part curable adhesive composition according to claim 1, wherein the aging resistant agent is selected from at least one of the group consisting of aminosalicylic acids, aminoisophthalic acids, carbodiimides, and derivatives thereof.

10. The one-part curable adhesive composition according to claim 1, wherein the non-reactive diluent is selected from the group consisting of pentaerythritol tetracrylate, pentaerythritol triacrylate, 1,6-hexanediol diacrylate, 1,4-butanediol diacrylate, propoxylated glyceryl triacrylate, trimethylolpropane triacrylate, and combination thereof.

11. The one-part curable adhesive composition according to claim 1, wherein the one-part curable adhesive composition optionally comprises a reactive diluent, a thixotropic agent, a silane coupling agent, a filler, and combination thereof.

12. The one-part curable adhesive composition according to claim 1, wherein the component (a) is present in an amount of 10% to 50% by weight based on the total weight of all components of the composition.

13. The one-part curable adhesive composition according to claim 1, wherein the component (b) is present in an amount of 5% to 20% by weight based on the total weight of all components of the composition.

14. The one-part curable adhesive composition according to claim 1, wherein the component (c) is present in an amount of 10% to 50% by weight based on the total weight of all components of the composition.

15. The one-part curable adhesive composition according to claim 1, wherein the component (d) is present in an amount of 2% to 20% by weight based on the total weight of all components of the composition.

16. The one-part curable adhesive composition according to claim 1, wherein the component (e) is present in an amount of 0.1% to 5% by weight based on the total weight of all components of the composition.

17. The one-part curable adhesive composition according to claim 1, wherein the component (f) is present in an amount of 0.1% to 5% by weight based on the total weight of all components of the composition.

18. The one-part curable adhesive composition according to claim 1, wherein the component (g) is present in an amount of 1% to 20% by weight based on the total weight of all components of the composition.

19. The one-part curable adhesive composition according to claim 1, comprising:
   (a) 10% to 50% by weight of the non-toughened epoxy resin having two glycidyl groups in one molecule,
   (b) 5% to 20% by weight of a non-toughened epoxy resin having more than two glycidyl groups in one molecule,
   (c) 10% to 50% by weight of the toughened epoxy resin,
   (d) 2% to 20% by weight of the latent curing agent,
   (e) 0.1% to 5% by weight of the curing accelerator,
   (f) 0.1% to 5% by weight of the aging resistant agent,
   (g) 1% to 20% by weight of the non-reactive diluent,
   (h) 0% to 5% by weight of a thixotropic agent,
   (i) 0% to 5% by weight of a silane coupling agent,
   (j) 0% to 20% by weight of a filler, and
   (k) 0% to 15% by weight of a reactive diluent,
   in which the weight ratios are based on the total weight of all components of the composition.

20. A method of bonding substrates together which comprises applying the one-part curable adhesive composition according to claim 1 to a first substrate, bringing a second substrate in contact with the adhesive composition applied to the first substrate, and subjecting the applied composition to conditions which allow the applied composition to be cured.

21. The method of bonding substrates together according to claim 20, wherein the substrate is independently comprised of metals, glasses, resin-based composite materials or ceramics.

\* \* \* \* \*